United States Patent [19]

Aida et al.

[11] 4,359,183

[45] Nov. 16, 1982

[54] CARTON HANDLE

[75] Inventors: Kouichirou Aida, Tokyo; Haruo Suzuki; Mitsuru Kuwabara, both of Kanagawa; Yukio Imaizumi, Tokyo, all of Japan

[73] Assignee: Sony Corporation, Tokyo, Japan

[21] Appl. No.: 217,156

[22] Filed: Dec. 16, 1980

[30] Foreign Application Priority Data

Dec. 29, 1979 [JP] Japan .................................. 54/171749

[51] Int. Cl.³ .......................... B65D 5/46; B65D 25/28
[52] U.S. Cl. .................................. 229/52 A; 206/462
[58] Field of Search .................... 229/52 A, 3.5 R; 217/36; 206/477, 478, 462

[56] References Cited

U.S. PATENT DOCUMENTS

| | | | |
|---|---|---|---|
| 970,237 | 9/1910 | Kerkow | 217/36 |
| 2,931,493 | 4/1960 | Pfohl | 206/462 |
| 2,931,494 | 4/1960 | Pfohl | 206/462 |
| 3,942,529 | 3/1976 | Waage | 229/3.5 R |

Primary Examiner—Herbert F. Ross
Attorney, Agent, or Firm—Hill, Van Santen, Steadman, Chiara & Simpson

[57] ABSTRACT

A handle of a carton is integrally formed of synthetic resin and is provided with a relatively rigid flange portion with an opening for insertion and a bag portion which is connected to a circumference of the opening. The bag portion includes a resilient expanded portion which has a larger dimension than the opening and a flexible bottom portion which is connected to the expanded portion at the opposite side of the opening. The bag portion is inserted into the opening of side wall of a carton, and the handle is equipped on the carton in such a manner that the flange portion and the expanded portion pinch the side wall of the carton.

7 Claims, 9 Drawing Figures

CARTON HANDLE

BACKGROUND OF THE INVENTION

1. Field of the Invention

This invention relates to a handle of a carton, and more specifically to a handle which is equipped on an opening formed on, for example, a side wall of a carton.

2. Description of the Prior Art

It is common for electrical apparatus and other articles to be accommodated by cartons made of corrugated cardboard for protecting the former when the apparatus is transported or stored. Typically, a carton used for this purpose would have a left side wall 1a and right side wall 1b as shown in FIG. 1. The side walls 1a and 1b have respective openings 2 over which handles 3 are fixed. A person's hand is inserted into the handle 3 through the opening 2 for carrying the carton 1.

A conventional handle 3 includes, for example, as shown in FIG. 2 to FIG. 5, a pasteboard 5 with a throughhole 5a, the size and shape of which are substantially the same as those of the opening 2 formed on the side walls of the carton 1. The handle 3 is comprised of a molded article 4 made of flexible synthetic resin, for example, polyethylene and includes a flange portion 6 and a bag portion 7 which are integrally connected. The flange portion 6 has a central opening 6a and the bag portion 7 is connected to marginal portion of the opening 6a, namely the opening 6a constitutes an entrance to the bag portion 7. As the flange portion 6 is flexible, molded article 4 is mounted on the pasteboard 5 in such a manner that the central opening 6a of the flange 6 coincides with the throughhole 5a of the pasteboard 5, and then the flange 6 is adhered to one surface of the pasteboard 5 by means of adhesive 30 or heat-welding. FIG. 3 shows an example to use adhesive 30 for connecting the flange 6 to the pasteboard 5. Further, the other surface of the pasteboard 5 is coated with adhesive 31 and the pasteboard 5 is adhered on the inner surface of the left side wall 1a or right side wall 1b of the carton 1 by the adhesive 31 in such a manner that the throughhole 5a of the pasteboard 5 coincides with the opening 2 of the carton 1.

FIG. 4 and FIG. 5 show apparatus or goods 32 accommodated by the carton 1 with the handle 3. Shock absorbing members made of, for example, expanded polystyrene are arranged between the goods 32 and the carton 1. According to the carton 1 provided with the handle 3, the inside of the carton 1 is intercepted by the bag 7 from the outside in spite of existence of the opening 2, and thereby dust can not enter into the carton 1. Hence, the goods 32 is prevented from being soiled by dust. Further, the bag 7 does not obstruct the insertion of the goods 32 into the carton as denoted by arrow A because the flexible bag 7 is bent downward by the goods 32 although the bag 7 projects into inside of the carton 1, as shown in FIG. 4. Still more, a hand or fingers 34 are inserted into the bag 7 through the opening 2 and then the bag 7 is bent upward by the fingers 34 when the carton 1 is to be carried as shown in FIG. 5. Thereafter, the carton 1 is lifted upward as denoted by arrow B by the hand. The handles 3 make the carrying of the carton 1 convenient because the bag 7 is easily bent upward to cause the carton 1 easy for handling. But the handle 3 is flexible and it requires pasteboard 5, and adhesives 30 and 31 must be used between the molded article 4 and the pasteboard 5 or between the pasteboard 5 and the carton 1, respectively. Further, it requires a time for curing of the adhesives 30 and 31. The goods 32 can not be inserted into the carton 1 as far as the adhesives 30 and 31 are not cured. Accordingly, the carton 1 with conventional handles 3 requires relatively long time for the accommodating operation.

OBJECTS AND SUMMARY OF THE INVENTION

Accordingly, it is an object of the present invention to provide an improved handle for a carton, which is free from the defects arising from the use of the conventional handle.

Another object of the present invention is to provide a handle which is equipped on side wall of a carton without adhesive.

A further object of the present invention is to provide a handle without pasteboard or other auxiliary parts of initially independent piece.

A still further object of the present invention is to provide a handle which is easily equipped on side wall of a carton.

A still further object of the present invention is to provide a handle which is easily taken away from the carton when necessary.

In accordance with one aspect of the present invention, there is provided a handle formed integrally from synthetic resin and comprised of relatively rigid flange portion with an opening and a flexible bag portion connected to the circumference of the opening.

The above and other objects, features and advantages of the invention will be apparent from the following detailed description of an illustrative embodiment which is to be read in connections with the accompanying drawings.

DESCRIPTION OF THE PREFERRED EMBODIMENTS

A handle according to an embodiment of the present invention is made of a mixture of polyethylene and polypropylene. That is, polyethylene and polypropylene are mixed with each other in a ratio of substantially 1:1. Then the mixture is melted to mold a sheet or plate having thickness of about 1 mm. It is preferred that the sheet is not subjected to the process of a stretching operation, and that molecular chains are not oriented.

Figure 1:
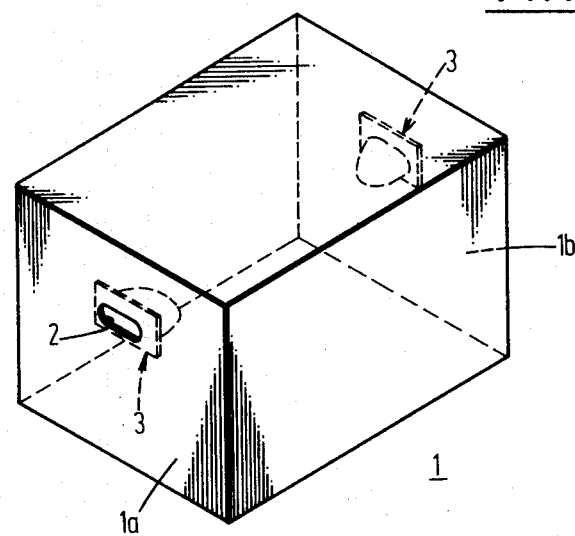
FIG. 1 is a perspective view of a carton with conventional handle thereon.
Figure 2:
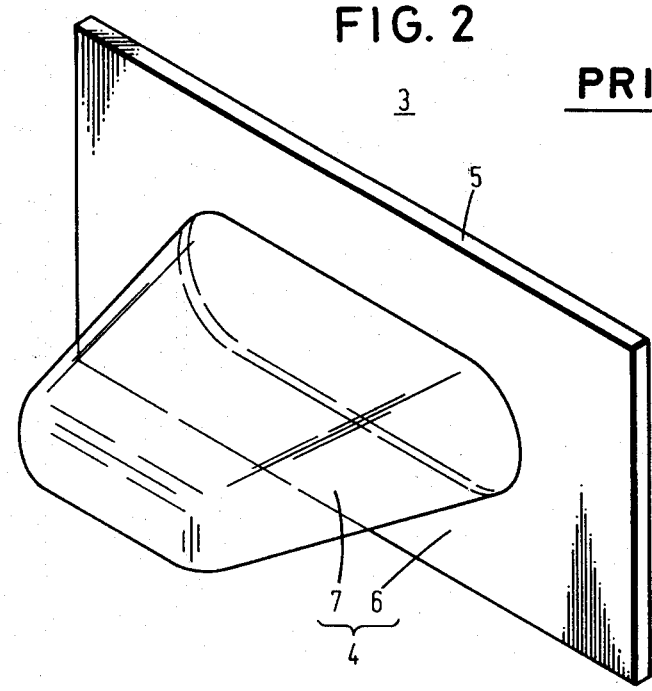
FIG. 2 is an enlarged perspective view of the conventional handle shown in FIG. 1.
Figure 3:
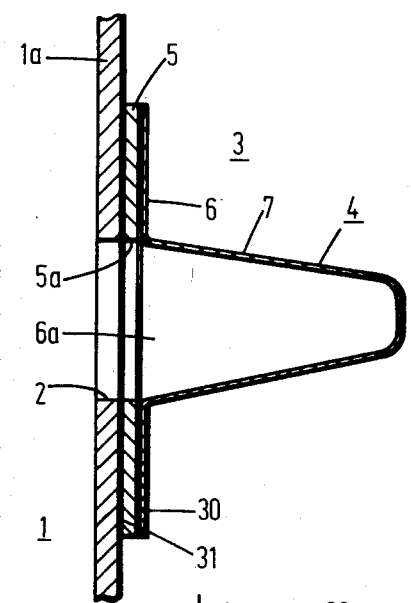
FIG. 3 is a cross section of a portion whereon the conventional handle is equipped of the carton shown in FIG. 1.
Figure 4:
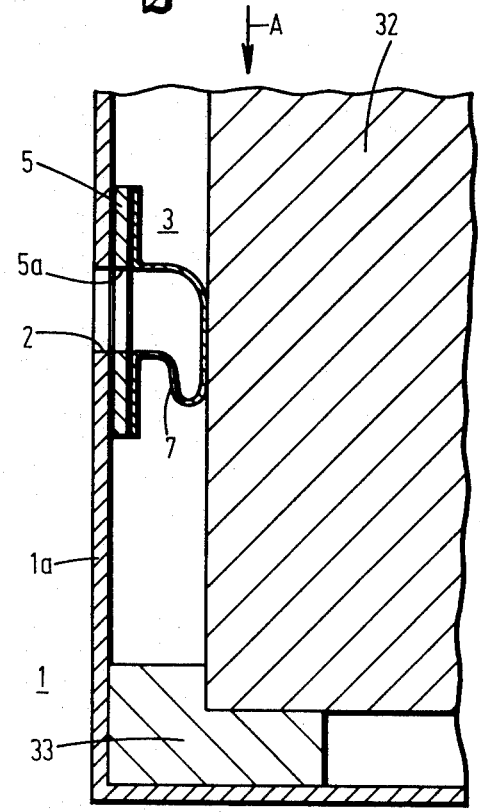
FIG. 4 is a cross section of the carton shown in FIG. 1 accommodating goods.
Figure 5:
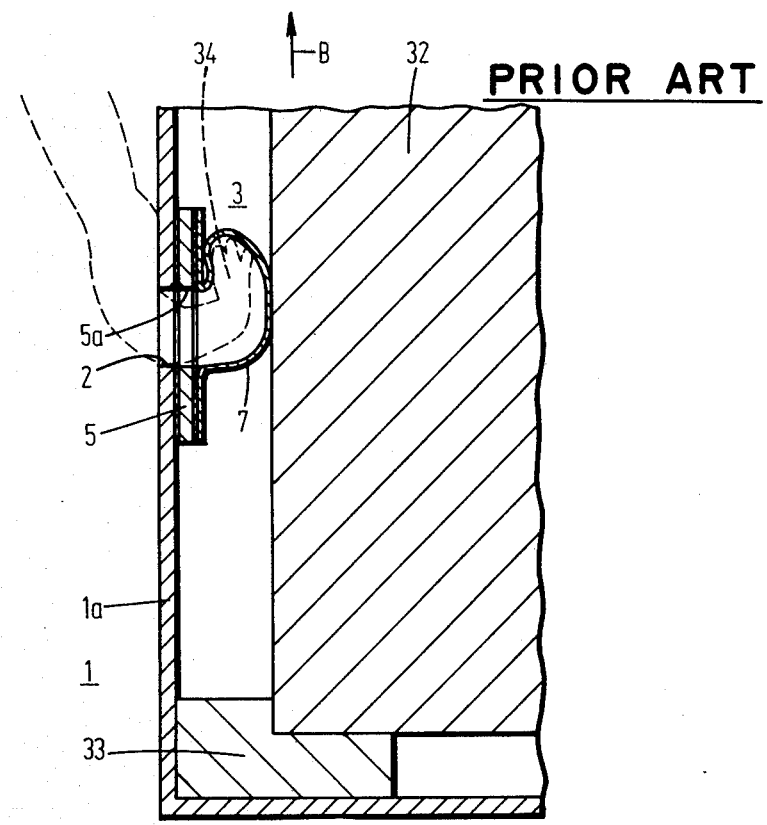
FIG. 5 is a cross section of the carton accommodating goods when the carton is lifted.
Figure 6:
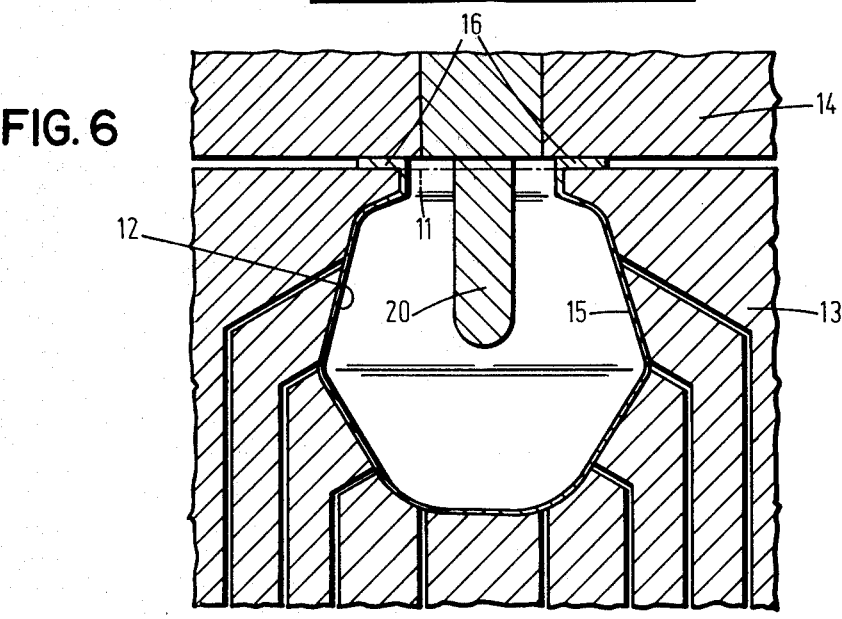
FIG. 6 is a cross section of an apparatus for providing a handle according to one embodiment of the present invention.

The sheet is then shaped to a rectangular synthetic resin plate 11 having a length of 8 cm and width of 12 cm, for example. The plate 11 is placed on a lower mold 13 having a cavity 12 as shown in FIG. 6 and the plate 11 is pressed against the upper surface of the lower mold 13 through an upper mold 14. Then the apparatus is heated and an atmosphere temperature is raised to be by 100° C. to 200° C. Next, air is extracted from the cavity 12, whereby the central portion of the plate 11 is stretched by vacuum forming process. When it is necessary, upwardly and downwardly movable heated push rod 20 pushes gradually the central portion of the plate 11 for the aid of stretching.

Figure 7:
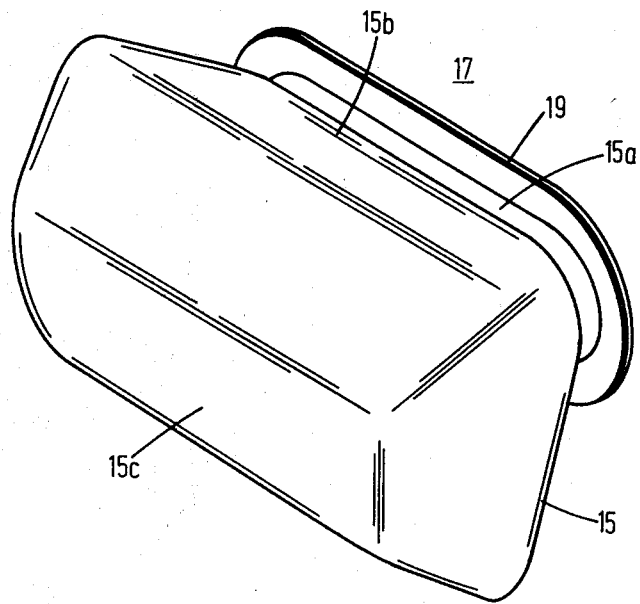
FIG. 7 is a perspective view of the handle of the embodiment shown in FIG. 6.

By the above mentioned steps, an opening 19a is formed at the center of the resin plate 11 and a bag portion 15 is formed along the internal surface of the cavity 12, and the bag portion 15 is connected to the circumference of the opening 19a. The apparatus is then cooled to the room temperature, and the upper mold 14 is taken away. Next, the plate 11 is taken away from the lower mold 13, whereby a handle 17 comprised of the bag portion 15 and a flange portion 19 integral to each other is obtained, as shown in FIG. 7. The bag portion 15 further includes a cylindrical portion 15a having a cylindrical opening which coincides with the central opening 19a of the flange portion 19, a swelled portion 15b which has larger dimension than the cylindrical portion 15a, and a bottom portion 15c which is connected to the opposite side of the swollen portion 15b with respect to the cylindrical portion 15a. The handle 17 is further subjected to a step for trimming the circumference of the flange portion 19 when necessary.

Figure 8:
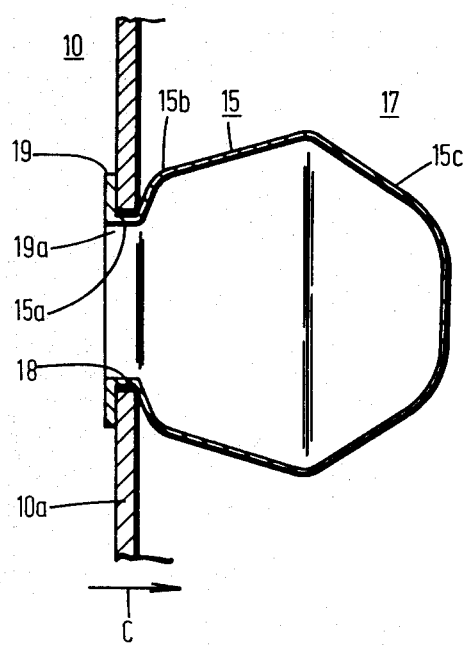
FIG. 8 is a cross section of a handle which is equipped on a side wall of a carton.

The handle 17 is equipped on, for example, left side wall 10a of a carton 10 made of corrugated cardboard as shown in FIG. 8. These equipping operations are as follows. First, the bag portion 15 is inserted into an opening 18 of the wall rightwardly as shown by arrow C manually from the outside of the carton 10. The bottom portion 15c is flexible and is easily deformed to pass through the opening 18. Next, the resilient swollen portion 15b is elastically deformed inwardly in the radial direction. By the displacement of the handle rightward or in the direction shown by arrow C, the swollen portion 15b gets over the edge of the opening 18 and then the swollen portion is restored to original shape. Whereby, the edge portion of the opening 18 of the wall is pinched between the flange portion 19 and the swollen portion 15b, while the cylindrical portion 15a is fitted into the opening 18. Thus, the handle 17 is mounted, on the left side wall 10a of the carton 10. Another handle 17 is mounted on the right side wall of the carton 10 in similar manner as mentioned hereinabove.

According to the handle 17, the flange portion 19 has a thickness of about 1 mm, cylindrical portion 15a has a thickness of from 0.8 mm to 0.9 mm, and bottom portion 15c has a thickness of from 0.1 mm to 0.3 mm, and the swollen portion 15b has a thickness of from 0.3 mm to 0.8 mm, and further the swollen portion 15b is gradually thinned from the cylindrical portion 15a to the bottom portion 15c, so that the bottom portion 15c is flexible, the swollen portion 15b is resilient, and the flange portion 19 is rigid. In fact, the handle 17 having flexible bottom portion 15c, resilient swollen portion 15b and rigid flange portion 19 is obtained by vacuum forming through the apparatus shown in FIG. 6.

The handle 17 is made of a mixture of polyethylene and polypropylene as mentioned. The polypropylene gives the formed article rigidity, while the polyethylene gives the article good stretchability and flexibility. Hence, the article made of the mixture of the former and the latter has all of these properties, as far as polyethylene to polypropylene ratio is from 3:1 to 1:3, while the ratio is substantially 1:1 in the preferred embodiment. When polypropylene is more than three times as much as polyethylene, the properties of polypropylene appear on formed article to decrease formability, to extend the time necessary for forming, and to make the bottom portion 15c of the bag 15 rigid. On the contrary, when polyethylene is more than three times as much as polypropylene, the formed article is too much flexible and the flange portion 19 is also flexible which make it difficult to pinch the side wall of the carton between the flange portion 19 and the swelled portion 15b.

The handle 17 according to this embodiment is mounted without adhesives. The bag portion 15 does not allow the entrance of dust into the carton. Further, the bag portion 15 does not obstruct the insertion of the goods 32 into the carton, because the flexible bag portion 15 is easily bent. Still more, the bag portion 15 makes the carrying operation easy by bending along the fingers inserted thereinto. The handle is, further, transparent or semi-transparent, when material is preferred, and by this arrangement inside of the carton can be observed through the handle 17 and the opening of a carton.

Figure 9:
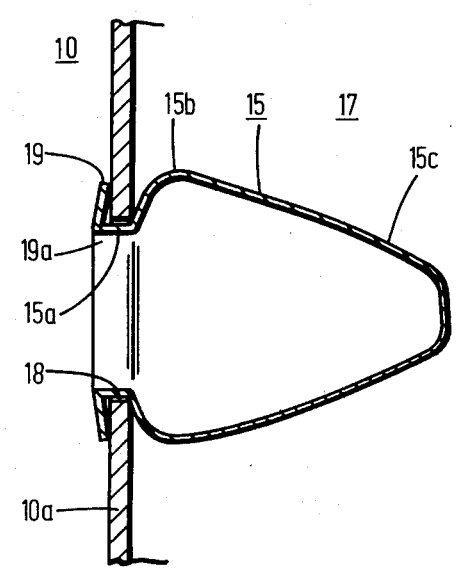
FIG. 9 is a handle according to another embodiment of the present invention.

FIG. 9 shows another embodiment of the present invention, wherein corresponding portions are denoted by the same reference numerals as in FIG. 8 and the descriptions thereof are omitted. According to this embodiment, the cross section of the bag-portion 15 is tapered. Further, a central portion near the opening 19a of the flange portion 19 is projected outwardly and the flange portion 19 is inclined in the radial direction, so that the circumference of the flange portion 19 is decreased. According to this arrangement, the side wall 10a is surely pinched by the flange portion 19 and the swelled portion 15b without rattling. Hence, the handle 17 is more perfectly mounted on the carton.

As mentioned above, according to the present invention, there is provided a handle comprised of a thin and flexible bag portion and a thick and rigid flange portion integral with each other by vacuum forming. Therefore, it does not require pasteboard for reinforcing the flange portion, and the handle is easily mounted on a carton by merely fitting it on the opening of a carton. Accordingly, materials and steps can be minimized.

Having described specific embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim as our invention:

1. A handle for a carton formed with a handle receiving opening, said handle integrally formed from synthetic resin and comprising a relatively rigid flange portion larger than said opening in said carton and adapted to be received on a first side of said carton, said flange portion having a rigid transverse portion which extends through said opening into said carton and a bag portion integrally connected to said transverse portion of said flange about the periphery of said opening in said carton and being on the second side of said carton, said bag portion including a resilient expanded portion which has a larger dimension than said opening and a flexible bottom portion connected to said expanded portion on the second side of said carton and the thicknesses of said flange portion being thicker than said expanded portion and said bottom portion being thinner than said expanded portion.

2. A handle according to claim 1, wherein said handle is made of a mixture of polyethylene and polypropylene.

3. A handle according to claim 2, wherein polyethylene to polypropylene ratio is from 1:3 to 3:1.

4. A handle according to claim 1, wherein said handle is transparent.

5. A handle according to claim 1, wherein said handle is semi-transparent.

6. A handle according to claim 1, wherein central portion of said flange portion is projected and is tapered in the radial direction so that the circumference of the flange portion is lowered.

7. A handle for a carton according to claim 1, wherein said flange portion and said expanded portion pinch the wall of said carton on opposite sides thereof.